United States Patent [19]

Kazmer

[11] Patent Number: 5,556,582
[45] Date of Patent: Sep. 17, 1996

[54] INJECTION MOLDING GATE FLOW CONTROL

[75] Inventor: David O. Kazmer, San Francisco, Calif.

[73] Assignee: Stanford University, Stanford, Calif.

[21] Appl. No.: 340,177

[22] Filed: Feb. 17, 1995

[51] Int. Cl.⁶ .......................... B29C 45/22; B29C 45/77
[52] U.S. Cl. ................ 264/40.1; 264/328.8; 264/328.12; 425/145; 425/570; 425/573
[58] Field of Search ................................. 264/40.1, 40.5, 264/328.8, 328.1, 328.12; 425/145, 146, 149, 570, 572, 573

[56] References Cited

U.S. PATENT DOCUMENTS

| | | | |
|---|---|---|---|
| 3,535,742 | 10/1970 | Marcus | 425/146 |
| 3,820,928 | 6/1974 | Lemelson | 425/146 |
| 3,861,841 | 1/1975 | Hanning | 425/146 |
| 4,932,854 | 6/1990 | Matsuda et al. | 425/146 |
| 5,141,696 | 8/1992 | Osuna-Diaz | 264/297.2 |
| 5,356,576 | 10/1994 | Fischbach | 264/40.1 |
| 5,389,315 | 2/1995 | Yabushita | 264/40.1 |

FOREIGN PATENT DOCUMENTS 60-212321  10/1985  Japan ...................... 425/146

*Primary Examiner*—Jill L. Heitbrink
*Attorney, Agent, or Firm*—Lumen Intellectual Property Services

[57] ABSTRACT

The invention provides methods and apparatus in which mold material flows through a gate into a mold cavity that defines the shape of a desired part. An adjustable valve is provided that is operable to change dynamically the effective size of the gate to control the flow of mold material through the gate. The valve is adjustable while the mold material is flowing through the gate into the mold cavity. A sensor is provided for sensing a process condition while the part is being molded. During molding, the valve is adjusted based at least in part on information from the sensor. In the preferred embodiment, the adjustable valve is controlled by a digital computer, which includes circuitry for acquiring data from the sensor, processing circuitry for computing a desired position of the valve based on the data from the sensor and a control data file containing target process conditions, and control circuitry for generating signals to control a valve driver to adjust the position of the valve. More complex embodiments include a plurality of gates, sensors, and controllable valves. Each valve is individually controllable so that process conditions corresponding to each gate can be adjusted independently. This allows for great flexibility in the control of injection molding to produce complex, high-quality parts.

2 Claims, 5 Drawing Sheets

INJECTION MOLDING GATE FLOW CONTROL

BACKGROUND OF THE INVENTION

The invention relates generally to the formation of molded parts. More specifically, the invention provides improved methods and apparatus for the formation of parts from plastics and similar mold materials by injection molding.

Injection molding is a commercially important technique used in the fabrication of parts from plastic and other mold materials. According to well known techniques, molten plastic or another mold material is forced by a ram through one or more gates into a mold cavity formed in the shape of the desired part. The ram continues forcing mold material through the gate until the mold cavity is filled and the mold material is packed under pressure inside the mold cavity. As the mold material cools, it solidifies in the shape of the mold cavity. When the material is sufficiently cool, the formed part is removed from the mold cavity and the apparatus is made ready for another molding cycle.

Multi-gated mold cavities are often used in the production of parts having complex shapes. As the name suggests, a multi-gated mold cavity includes multiple gates through which the mold material is forced into the mold cavity. Mold material is most commonly forced by a single ram through a common manifold serving all of the gates and through each of the gates into the cavity. As with a single-gated mold cavity, mold material is forced into the mold cavity until the mold material is filled and packed inside the mold cavity. A "knit line" is formed at the interface where mold material flowing from a given gate meets and joins with mold material flowing from a different gate.

The properties and positions of knit lines are important considerations in the performance and appearance of injection molded parts. A knit line formed during injection molding according to known techniques is typically much less strong than the mold material itself. For this reason, it is important that a knit line not be located in a region of high stress in the finished part. Additionally, it may be desirable to control the location of the knit line in order to enhance the appearance of the finished part.

The location of a knit line in a finished part can be controlled to some degree by changing the relative speed at which mold material flows through the individual gates of a multi-gated cavity. Previously, this was most commonly done by machining the gates to change the size of the gate openings. However, this approach is expensive and time consuming and does not allow for quick adjustments to be made between mold cycles, and certainly not during a single mold cycle.

A somewhat more flexible approach to flow control through individual gates of multi-gated cavities is disclosed in U.S. Pat. No. 5,141,696 to Osuna-Diaz. The Osuna-Diaz patent discloses a molding machine in which a separate manually adjustable valve is disposed within the flow channel that feeds each gate. By adjusting the valve, a user of the machine can adjust the rate at which mold material flows through the corresponding gate. According to the patent, this allows the user to "balance" the flow through the gates by adjusting the valves between mold cycles. Although the patent does not discuss it specifically, the apparatus could be used to control the location of the knit line by adjusting the rates of flow through the gates relative to one another. However, the Osuna-Diaz patent does not disclose any apparatus suitable for dynamically adjusting the flow of material through the gates during a single mold cycle.

In addition to issues related to knit line location, problems sometimes occur that arise from shrinkage and warping of parts during the filling, packing and cooling stages. To achieve greater reliability and repeatability between molding cycles, researchers have sought means for controlling certain conditions within the mold cavity during the molding cycle. An investigation of this type is reported in Chiu, Wei, and Shih, "Adaptive Model Following Control of the Mold Filling Process in an Injection Molding Machine," *Polymer Engineering and Science*, vol. 31, no. 15, pp. 1123–29 (mid-August 1991).

In the Chiu investigation, a molding machine was fitted with a pressure transducer for reading pressure within the mold cavity during the molding operation. A servo-hydraulic system controlled by a computer was also added for controlling the pressure exerted by the injection ram. The computer was programmed to control the ram pressure based on signals from the pressure transducer. In this way, the pressure at one point inside the cavity during the molding process could be indirectly controlled in an attempt to follow a predetermined optimal pressure profile.

More or less continuous control of a machine parameter, e.g. ram pressure, during a mold cycle based on a reading of a condition from inside the mold cavity, e.g. cavity pressure, can be referred to as "closed-loop" control. Closed-loop control can significantly reduce variations between individual mold cycles. Additionally, closed-loop control provides for a greater degree of flexibility because the machine parameters can be adjusted during an individual mold cycle.

The apparatus disclosed in Chiu is less than ideal however, in that controlling the ram pressure controls the cavity pressure only indirectly. It would be advantageous to provide more direct means for controlling the flow of mold material through the gates so that conditions inside the mold cavity would be more directly controllable. It would be more advantageous if such means provided for effective closed loop control of the flow of material through the gate. Finally, it would be very advantageous if such means for controlling the flow of material through the gate could be adapted to provide for individual control of material flow through each of the gates of a multi-gated mold cavity. The invention provides methods and apparatus having these and other advantages, as will be described more fully below.

SUMMARY OF THE INVENTION

The invention provides improved methods and apparatus for injection molding of molded parts made of plastic or another mold material. According to the invention, mold material flows through a gate into a mold cavity that defines the shape of the part being molded. An adjustable valve is provided that is operable to change the effective size of the gate to control the flow of mold material through the gate while the mold material is flowing through the gate into the mold cavity.

Preferably, a sensor is provided for sensing a process condition while the part is being molded. The sensor can be a position sensor for detecting the position of the adjustable valve, a pressure sensor for sensing a pressure inside the mold cavity, or some other sensor. During molding, the valve is adjusted based at least in part on information from the sensor.

In the preferred embodiment, the adjustable valve is controlled by a digital computer, which includes circuitry for acquiring data from the sensor, processing circuitry for computing a desired position of the valve based on the data from the sensor and a control data file containing target process conditions, and control circuitry for generating signals to control a valve driver to adjust the position of the valve.

More complex embodiments will include a plurality of gates, sensors, and controllable valves. Each valve is individually controllable so that process conditions corresponding to each gate can be adjusted independently. This allows for great flexibility in the control of injection molding to produce complex, high-quality parts.

Other features and advantages of the present invention will become apparent from the following detailed description of the preferred embodiment, taken in conjunction with the accompanying drawings, which illustrate by way of example the principles of the invention.

DESCRIPTION OF THE PREFERRED EMBODIMENTS

Figure 1:
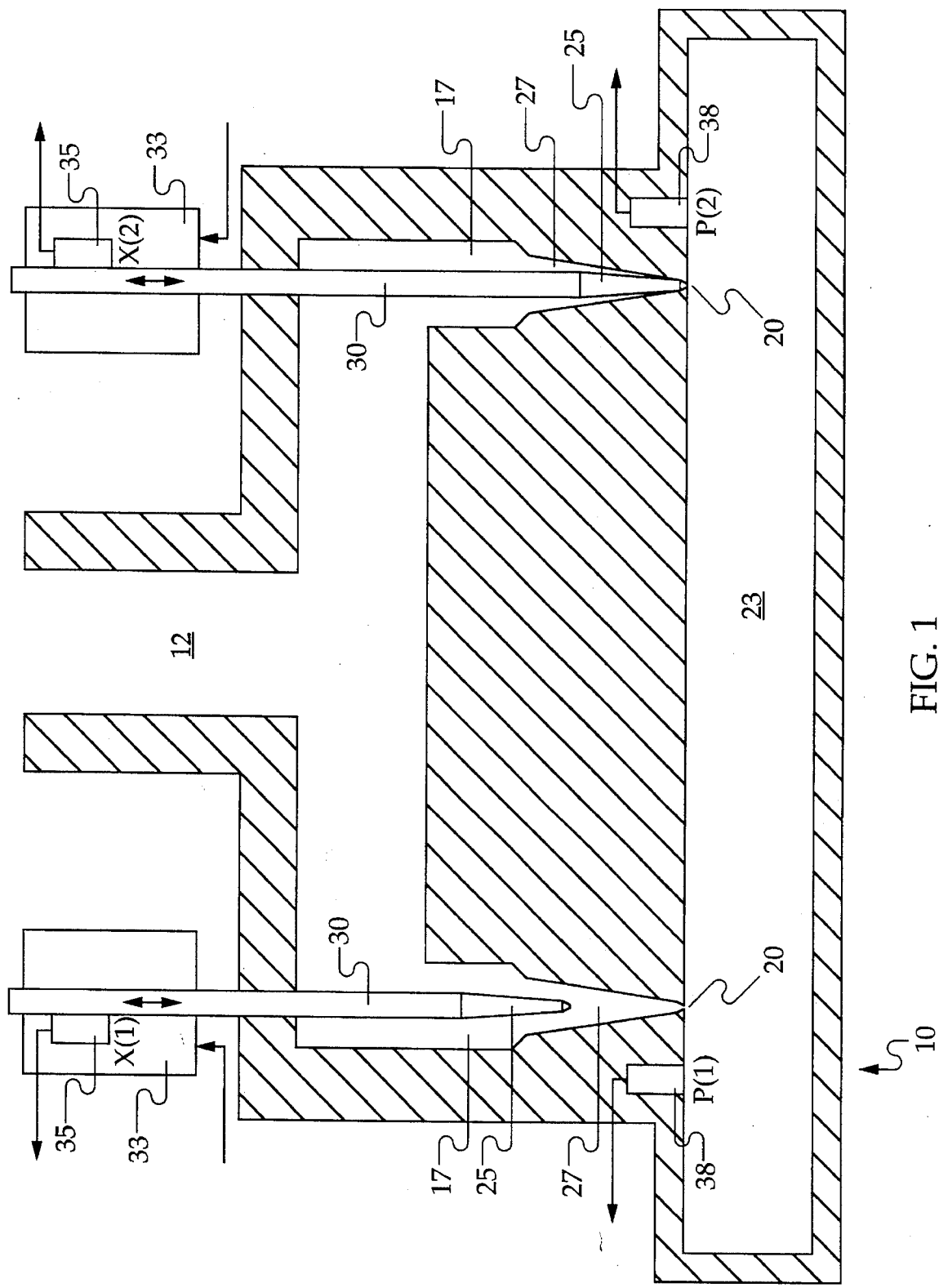
FIG. 1 is a schematic depiction of a mold assembly adapted for use with the invention.

FIG. 1 is a schematic depiction of a mold assembly adapted for use with the invention. As shown therein, the mold assembly 10 includes a main channel 12 through which molten mold material is forced under pressure by a ram (not shown) to a manifold 15. The manifold defines a number of branch channels 17. The branch channels lead in turn to a number of gates 20. The mold material is forced though the gates into a mold cavity 23.

The mold cavity 23 defines the shape of the part being molded. For the sake of clarity, FIG. 1 depicts a mold cavity having a simple rectangular cross-section. Molded parts will typically have much more complex shapes and, as will be discussed further below, the invention provides distinct advantages in the production of highly complex molded parts.

The mold assembly 10 includes a controllable valve 25 just upstream of each of the gates 20. Each valve 25 comprises a tapered flow channel 27, a similarly tapered valve stem 30, and a valve stem driver 33. The valve stem driver includes apparatus, generally mechanical or hydraulic, for controlling the longitudinal position of the valve stem within the corresponding tapered flow channel. Each valve stem 30 has a corresponding position sensor 35. Each position sensor produces an electrical signal indicative of the longitudinal position of the corresponding valve stem within the tapered flow channel.

The mold assembly 10 also includes a number of pressure sensors 38. Each pressure sensor produces an electrical signal corresponding to the pressure within the mold cavity in the region of the pressure sensor. Typically, one pressure sensor is located near each gate 20.

Those skilled in the art and familiar with injection molding will appreciate that conditions inside the mold cavity near each gate may be controlled by controlling the longitudinal position of each valve stems within its tapered flow channel 27 just upstream of each gate 20. For example, the rate at which mold material flows through a given gate during the cavity filling stage depends on the effective size of the gate, which is determined by the position of the valve stem within the tapered flow channel. During the packing stage, the pressure drop across any gate similarly depends on the position of the valve stem corresponding to that gate.

Figure 2:
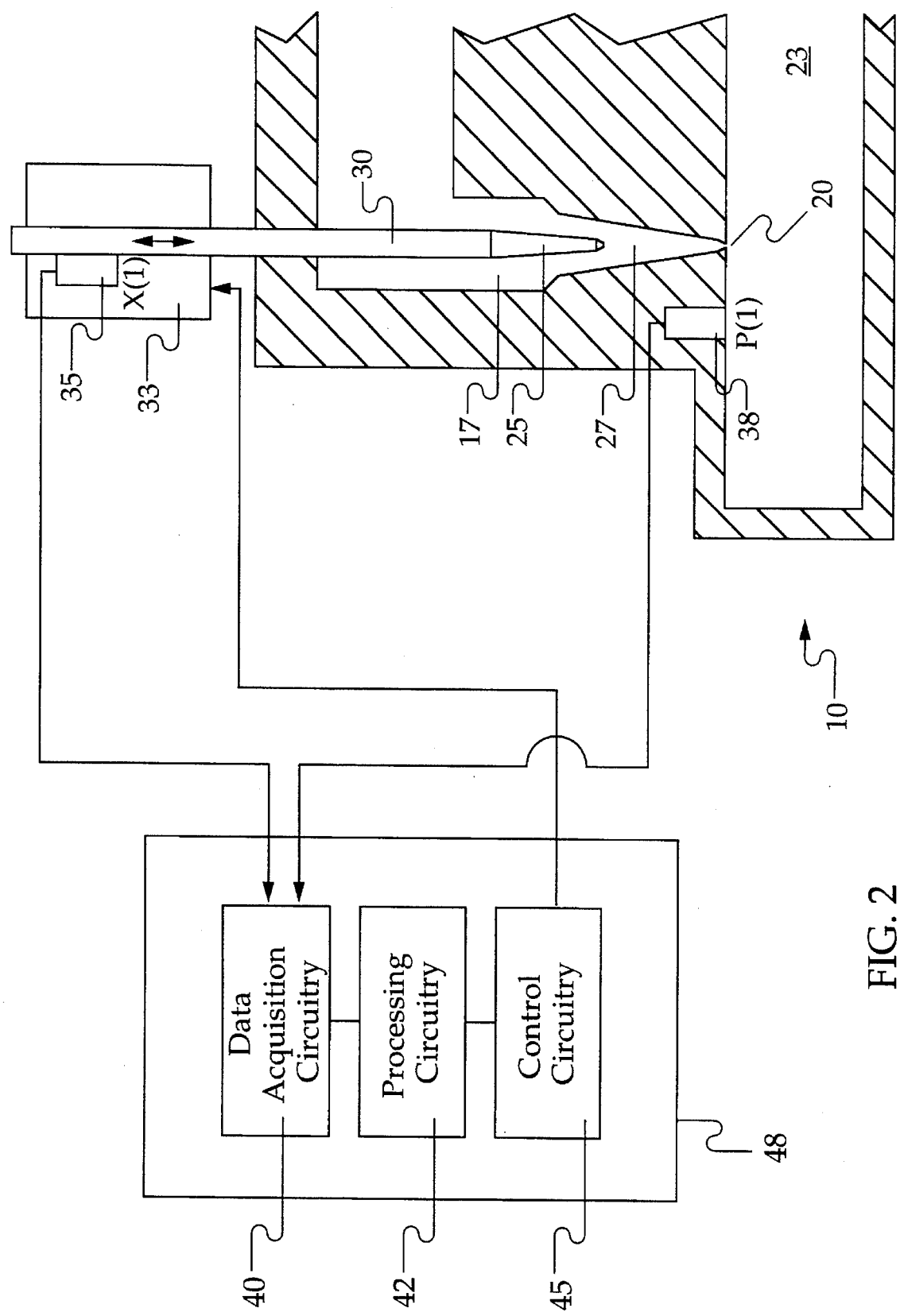
FIG. 2 depicts one side of the mold assembly 10 shown in FIG. 1.

FIG. 2 depicts one side of the mold assembly 10 shown in FIG. 1. FIG. 2 shows a gate 20, a tapered flow channel 27, a valve stem 30, a valve stem driver 33, a position sensor 35, and a pressure sensor 38. FIG. 2 also includes a highly schematic depiction of certain data acquisition and control circuitry for implementing the invention. This circuitry includes data acquisition circuitry 40, processing circuitry 42, and control circuitry 45.

As depicted schematically in FIG. 2, the position sensor 35 and pressure sensor 38 are connected to the data acquisition circuitry so that signals indicative of the valve stem position and mold cavity pressure are provided to the data acquisition circuitry. Data corresponding to these signals are then sent to the processing circuitry 42.

Based in part on the signals from the position sensor 35 and the pressure sensor 38, the processing circuitry 42 generates information used to control dynamically the position of the valve stem 30. This information is sent to the control circuitry 45, which generates control signals which are then sent to the valve stem driver 33. Generation of the control signals based on the signals from the pressure and position sensors is discussed in more detail below.

The other side of the mold assembly is configured in the same way—the pressure and position sensors are connected to the data acquisition circuitry 40, and the valve stem driver is connected to the control circuitry 45. In more complicated systems having more sensors and more valves, a connection will be provided to connect each additional sensor to the data acquisition circuitry, with another connection between the control circuitry and each additional valve stem driver.

Data acquisition circuitry 40, processing circuitry 42, and control circuitry 45 may all be embodied in a specially modified digital computer 48. In a current experimental embodiment, the computer is an IBM PC-compatible computer running custom software written in the C programming language. A sample program listing for implementing the invention is attached to this specification as Appendix A.

Referring to Appendix A, the program listed therein first executes a number of preliminary steps in preparation for molding. Once the molding operation begins, the program cycles repeatedly through a series of four subroutines:

"Get_Process_Signals( )";
"Get_Desired_Signals( )";
"Calc_Control_Signals( )"; and
"Output_Results".

On each cycle, or about once every twenty-five milliseconds, subroutine "Get_Process_Signals()" reads the electrical signals generated by the position and pressure sensors in the mold assembly. The subroutine then converts those signals into values corresponding either to the respective positions of the valve stems or the pressures within the mold cavity.

Following this, "Get_Desired_Signals()" queries a control data file "D:\DAVE\CONTROLS.SET", and based on the contents of this file, calculates target values for either valve stem positions or cavity pressures. Control data file "D:\DAVE\CONTROLS.SET" contains an array of target process conditions (valve stem positions or cavity pressures) as a function of time for each valve.

File "D:\DAVE\CONTROLS.SET" is loaded into the memory of the computer for accessing while the main program is running during the molding process. It should be appreciated that control data files could be stored in any suitable data storage area in virtually any medium. In the future, designers may routinely provide molding machine operators with a specification for a mold cavity along with a diskette, tape, memory card or some similar medium containing a suitable control data file for molding the desired parts.

Although in the present embodiment the target process conditions are either valve stem positions or cavity pressures, other target process conditions are conceivable as well. For example, it is possible that cavity temperatures could be used. If this were the case, appropriate temperature sensors would generally be provided so that actual sensed process conditions could be matched to corresponding target process conditions.

Subroutine "Calc_Control_Signals()" calculates control signals based on the differences between: 1) the actual process conditions sensed and computed in subroutine "Get_Process_Signals()"; and 2) the target process conditions computed in "Get_Desired_Signals()". The control signals could be generated based on sensed or stored parameters in addition to the actual and target process conditions. However, it is presently contemplated that the control signals will always be generated based at least in part on the comparison between a sensed process condition and a stored target process condition.

The control signals generated by subroutine "Calc_Control_Signals()" are used to control the valve stem drivers (referred to as "servovalves" in the comments to the program listing) to force the actual process conditions to closely approximate the target process conditions. At the end of each cycle, the appropriate control signals are sent to the valve stem drivers by subroutine "Output_Results()". This subroutine also sends output signals to user-interface strip charts and an output data file. The program continues cycling through the four subroutines until the molding procedure is complete. Completion of the molding procedure is indicated by the appearance of (−1.0, −1.0) in the array of times and target process values contained in the control data file "D:\DAVE\CONTROLS.SET".

It will be appreciated that the process conditions during the molding procedure can be changed significantly simply by modifying the contents of the control data file "D:\DAVE\CONTROLS.SET". This allows a programmer or operator of the apparatus a great deal of convenience and flexibility in designing specific molding cycles to achieve a wide range of desirable results.

Figure 3:
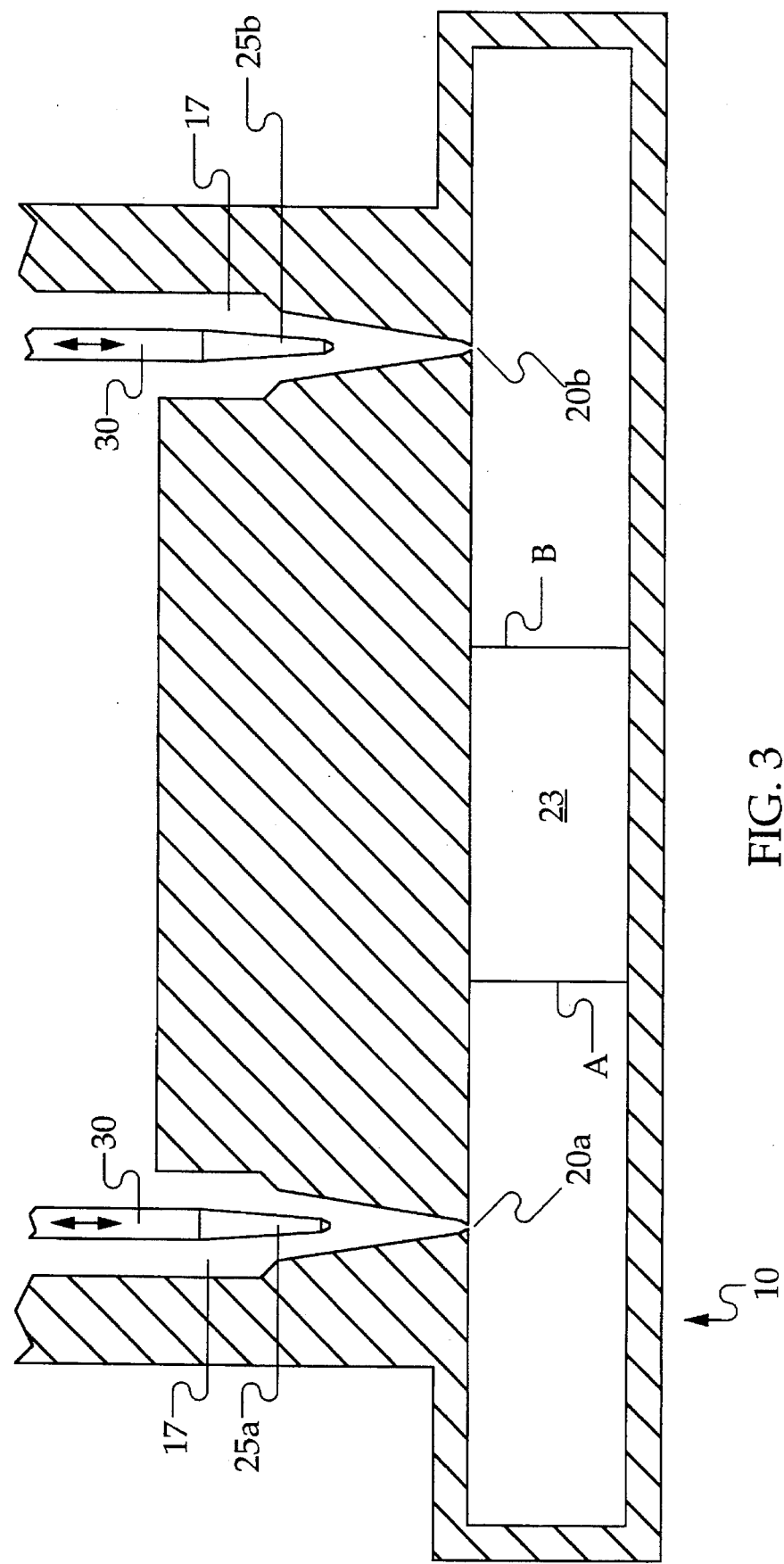
FIG. 3 illustrates a technique for moving a knit line from an initial location to a preferred location.

Some simple examples will illustrate potential uses of the invention. Referring to FIG. 3, if the mold material flows at an equal rate through the left gate 20a and the right gate 20b, then the mold material will meet and a knit line will form near the center of the mold cavity as indicated at position A. If this is not a good location for the knit line, e.g., if this is a position of the part where appearance is critical or a position that must withstand high stress, then the knit line can be moved simply by changing the contents of a file containing target valve stem positions. For example, by holding the left valve 25a open to a greater degree than the right valve 25b, mold material can be made to flow more quickly through the left valve and the knit line can be caused to form nearer the right valve, e.g., at position B.

Figure 4:
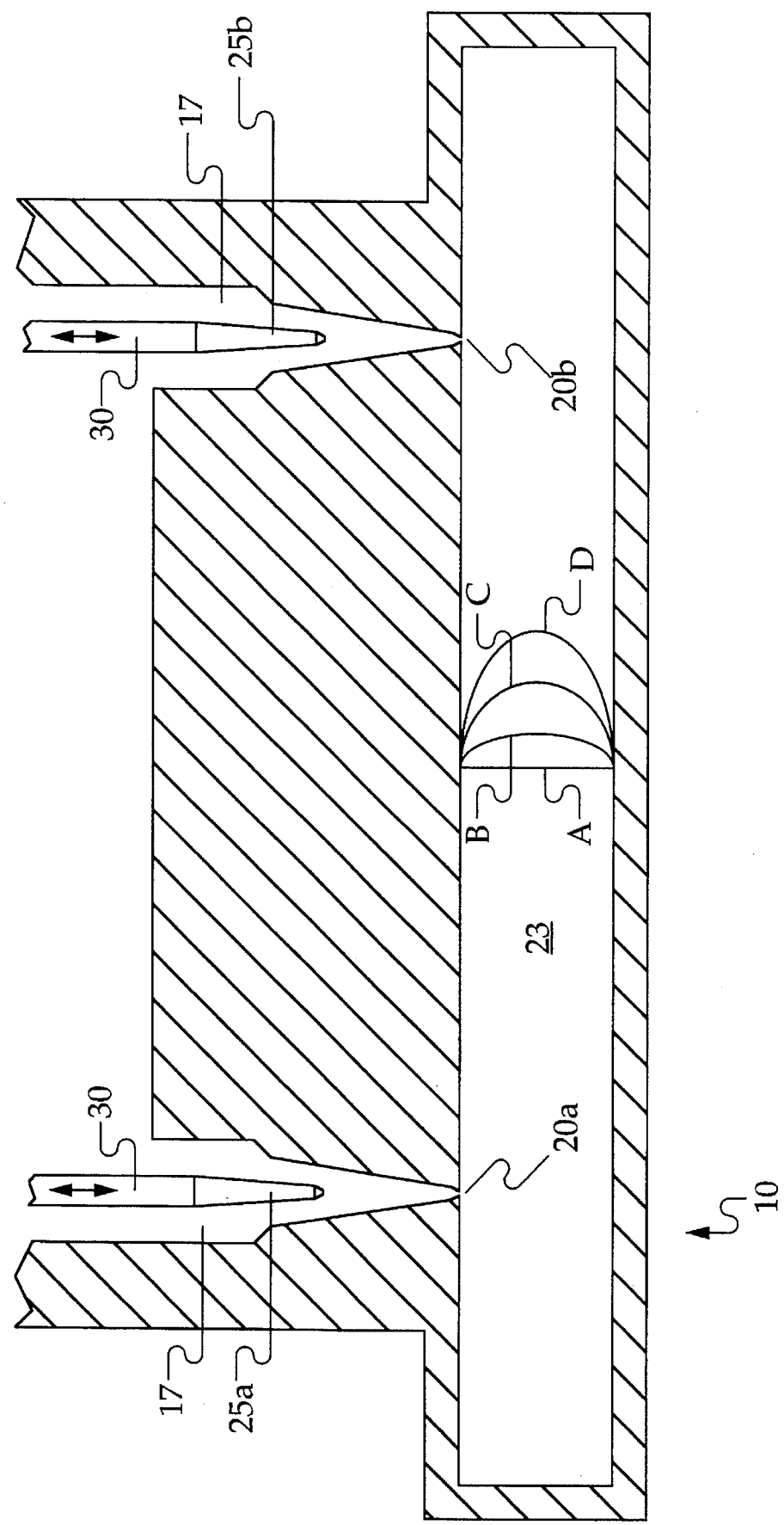
FIG. 4 illustrates a technique for forming a knit line having higher strength than those formed by conventional methods.

FIG. 4 illustrates a method that can be used to form a knit line having greater tensile strength than knit lines formed using known methods. If each valve 25a, 25b is held open to the same degree, material will flow evenly into the mold cavity 23 and the knit line will form initially in the middle of the cavity at position A. If the left valve 25a is subsequently held open somewhat more than the right valve 25b, during the cavity packing stage, then the mold material will be forced in the direction of the right valve. Because the mold material cools and solidifies from the outside of the mold cavity inward, the mold material in the center of the cavity will flow more than the mold material near the edges of the cavity and the knit line will deform as indicated at position B. As more material is packed into the cavity, the knit line will move further through position C, with the mold material finally solidifying at, for example, position D.

A non-planar knit line joint as indicated at position D is inherently stronger because of its shape than the simple planar knit line that would otherwise result. Furthermore, the interface between the molding material on each side of the knit line has a larger surface area and the flow of material across the knit line increases the degree of mixing across the knit line as the joint is formed. These factors result in a joint that is substantially stronger than the simple planar joint that would otherwise have been formed. In experiments, this method has been used to form non-planar knit lines whose strength approaches, and in some cases appears to exceed, the inherent strength of the mold material itself.

Figure 5:
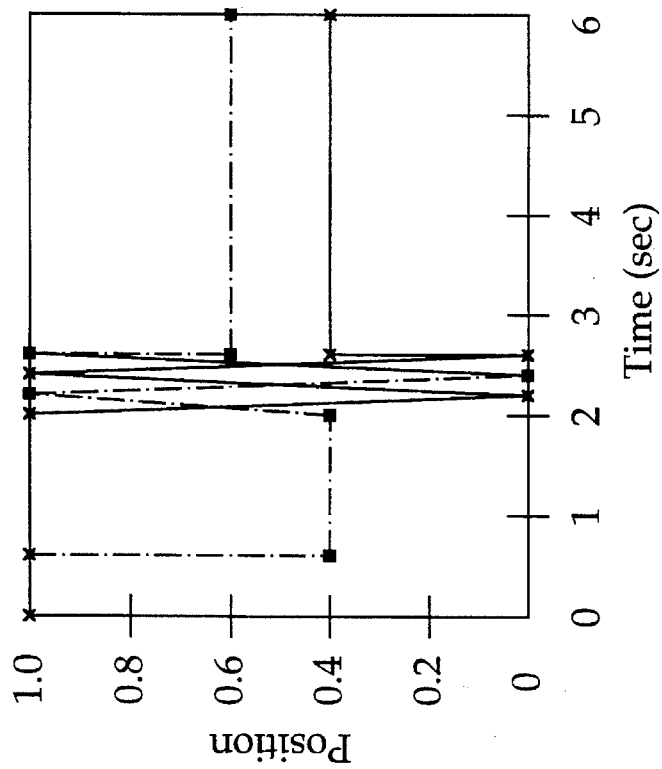
FIG. 5 is a graphical depiction of target valve positions as a function of time for a two-gated mold cavity.

Listings for exemplary control data files are provided in Appendixes B1 and B2. Appendix B1 lists a control data file for a cavity having two gates, each with its own controllable valve. As indicated by the "1" in the first line of data, the control data file of Appendix B1 provides for the direct control of the position of the two valve stems. The position of each valve stem is controlled over a time from zero to six seconds after molding begins. Target positions are listed as a function of time for each valve. The target positions for each valve are also indicated graphically in FIG. 5. In FIG. 5, target positions for valve one are indicated by filled boxes and target positions for valve two are indicated by crosses.

As can be appreciated from Appendix B1 and FIG. 5, both valves are initially opened fully (position=1.0). This results in high rates of flow and low shear stresses through the gates. At about 0.3 seconds, valve one is restricted somewhat (position=0.4) to move the knit line closer to that gate. Beginning at a time just after two seconds, the valves are cycled alternately between open and closed positions, in effect "stirring" the mold material, to facilitate the flow of mold material across the knit line and thereby enhance the strength of the resulting joint. Finally, valve one is left open somewhat more than valve two in order to inhibit shrinkage of the part in the vicinity of valve one as mold material is packed into the cavity and the resulting part solidifies and cools.

Figure 6:
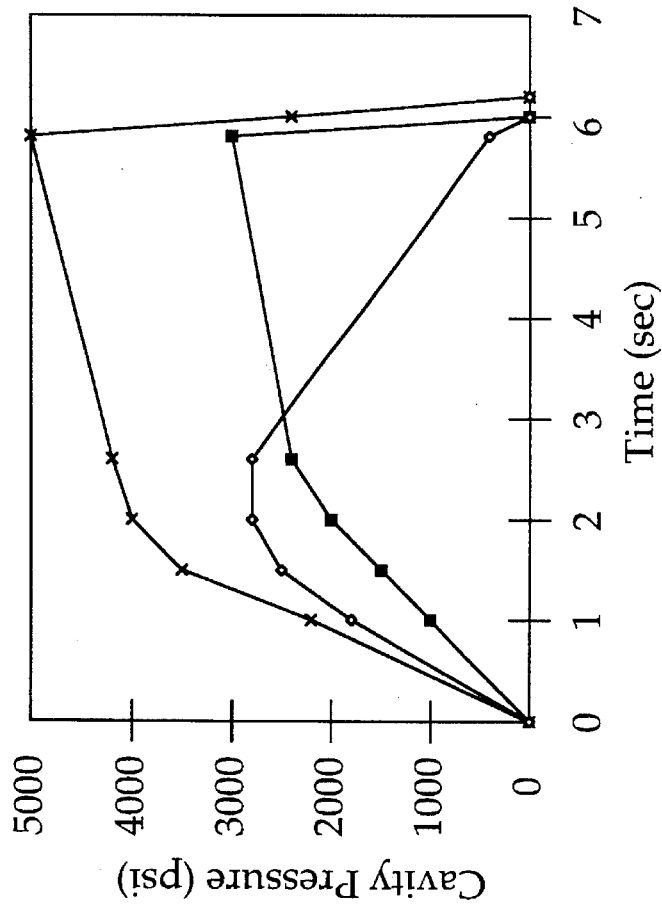
FIG. 6 is a graphical illustration of target cavity pressures as a function of time for a three-gated mold cavity.

Another exemplary control data file is listed in Appendix B2. This control data file provides for the control of three valves in a cavity having three gates. As indicated by the appearance of "0" in the first line of data, this file controls the three valves using the cavity pressures in the vicinity of the three gates as target process conditions. The target pressures are depicted graphically in FIG. 6. In FIG. 6, the target pressure in the vicinity of gate 1 is shown as a filled box, pressure in the vicinity of gate 2 as a cross, and pressure in the vicinity of gate 3 as a diamond.

As shown in Appendix B2 and FIG. 6, the cavity pressure in the vicinity of valve 1 has a relatively low upward slope. This implies a relatively slow fill rate around that gate. In contrast, the cavity pressure in the vicinity of valve 2 increases at a much greater rate. This implies rapid packing of the cavity in the vicinity of that gate. After increasing to its peak value, the pressure in the vicinity of valve 3 is made to taper to zero (by gradually closing that valve). This minimizes residual stresses in that region of the part. With use of the invention, the flow patterns and shrinkage near each gate can be controlled independently.

The invention can provide a wide range of benefits by allowing the implementation of control strategies substantially more sophisticated than those previously available. For example, splay and burning are two common defects that result from inappropriate shearing of the mold material during the filling stage. Shear rates through the gates are inversely proportional to the effective size of the gates. Thus, the shear rate can be confined within acceptable ranges by controlling the position of the valve stems to open or close the valves as necessary.

The pattern in which the mold is filled with mold material can be controlled by adjusting the rates of flow through each of the gates of a multi-gated cavity. Control of the mold filling pattern to adjust the position of knit lines has been discussed above. Additionally, alternately opening and closing ("cycling") the valves of a multi-gated cavity after the cavity has been filled can substantially enhance the strength of a knit line by increasing the flow of mold material across the knit line. This is illustrated and discussed above with reference to Appendix B1 and FIG. 5.

Control of the mold filling pattern can also be used to affect fiber orientations in finished parts. Fibers of glass or other materials are sometimes added to plastic resins to produce composite materials having enhanced strength. The properties of these composites are highly dependant on the orientation of the fibers within the part. The orientation of the fibers is in turn highly dependent upon the filling pattern and the shear history experience by the fibers during the molding process. Both the filling pattern and the shear history can be manipulated by adjusting the valves as the mold cavity is filled and packed with mold material.

Several significant benefits are possible through use of the invention to during the cavity packing stage, in which mold material is packed under pressure into the cavity after the cavity is initially filled. Molded plastic parts undergo significant shrinkage during the final stages of the mold process. This shrinkage is dependent upon the cavity pressures across different regions of the part. In general, higher cavity pressures indicate that more material has been forced into the cavity and less shrinkage is likely to result. Using the invention, cavity pressures near each gate can be controlled independently by varying each valve's position. The cavity pressure at a given gate can be increased by increasing the effective size of that gate by opening the corresponding valve. This will reduce shrinkage in the region of that valve. Conversely, by restricting a given valve, packing of material near that gate can be reduced, thereby increasing shrinkage in that region of the part.

Warping of the part can result from differential shrinkage across different regions of the part as the part cools. By increasing or decreasing the sizes of the individual gates of a multi-gated cavity, shrinkage of the part can be equalized across the entire part to minimize warping.

Overpacking, which occurs when too much material flows into a given region of a cavity, may also yield low quality parts. Using the invention, cavity pressures in the region of each gate can be monitored and controlled to prevent overpacking in the region of any gate.

Flash is a common defect that occurs excessive cavity pressure causes deflection of the mold steel and plastic flows outside of the cavity. Sink is another common defect that occurs when cavity pressures are too low and excessive shrinkage causes surface irregularities to appear. By controlling multiple cavity pressures independently, it is possible to reduce the defects in one area while leaving other areas largely undisturbed.

Use of the invention can substantially enhance cavity pressure consistency during different mold cycles or across different machines. Variations in machine behavior (ram acceleration dynamics, melt temperature, injection pressure, etc.) or material properties (viscosity, thermal conductivity, etc.) can be compensated for by controlling each valve's position directly based on pressures sensed within the cavity.

When a mold machine is restarted after, for example, changing the mold, replacement of mold material, cleaning, etc., the machine may take some considerable time to return to its normal, steady-state operating condition. By controlling the valves based on direct measurements of pressures within the cavity, initial start-up variations can be compensated for, thereby allowing for the immediate return to production of high quality parts.

Retrofitting existing mold machines with the invention can substantially enhance the capabilities of these older machines. This can allow existing machines to produce higher quality parts than they would previously have been capable of.

Some representative examples and suggestions for use of the invention have been described herein. Those skilled in the art will have little difficulty writing control data files to achieve the suggested benefits suggested above. Other strategies will no doubt be possible as well. It should be appreciated, therefore, that potential uses of the invention are limited only by the creativity, ingenuity, and experience of programmers and users of the apparatus.

Thus, it is contemplated that substantial refinements and additions may be made both in hardware and software as the art develops and the invention is developed more fully for industrial use. Therefore, the scope of the invention should not be limited to the exemplary embodiment and examples described above. The scope of the invention should instead be determined primarily with reference to the appended claims, along with the full scope of equivalents to which those claims are legally entitled.

APPENDIX A

```c
#include "D:\LW\INCLUDE\dataacq.h"
#include "D:\LW\INCLUDE\formatio.h"
#include "D:\LW\INCLUDE\lwsystem.h"
#include "D:\LW\INCLUDE\userint.h"
#include "defines.h"                  /* Only these two .h files are included since the
#include "vars.h"                        others are used solely by National Instruments
                                         User-Interface kit. */ main()
{
int handle,id,done,molding;

done=FALSE;                           /* set main loop to begin idle */ molding=FALSE;                        /* assume molding machine is off to start */

StartUp();                            /* Read input files and initialize variables */ while (!done)
   {
   molding=Wait_For_Machine();        /* Cycle for molding signal to start */

GetUserEvent(TRUE,&handle,&id);    /* Look for User Override */
   if (id==DFC_Exit) done=TRUE;
   time=0.0;                          /* Set time to zero while not molding */ while (molding)                    /* Cycle while molding */
      {
      GetUserEvent(FALSE,&handle,&id); /* Look for User Override */
      if (id==DFC_Exit) molding=FALSE;
      Get_Process_Signals();          /* Get Pressure and Position Data */ molding=Wait_For_Machine();     /* Cycle for molding signal to stop */ if (dtt>dt)                     /* Send signal only every 25 mS (dt) */
         {
         Get_Desired_Signals();       /* Get Desired Position or Pressure Signals
                                         for that specific time T. Note: these signals
                                         are time varying as specified via input arrays */

Calc_Control_Signals();      /* Calculate Control Signals for Servovalves.
                                         Note: this code utilizes Proportional, Integral,
                                         Differential (PID) but many more simple and compl
                                         forms exist */

Output_Results();            /* Output control voltages to servovalves and
                                         process data to user-interface */
         }
      }
   }
   CloseFile("D:\\DFC\\OUTPUT.DAT");
   return(0);
}
/******************************************************************************/
int Wait_For_Machine()
/* This procedure reads channel 11 for the current stage of the molding cycle.
The molding machine outputs a 10V signal if it is currently in the filling,
packing, or holding stage of injection molding and 0 volts otherwise. This
is used to tell the control logic when to start and stop. */
{
```

```
int i,go;
float Ram_Forward;

AI_VRead(1,11,1,&Ram_Forward);
   go=FALSE;
   if (Ram_Forward>0.3) go=TRUE;

return(go);
}
/******************************************************************/
void Get_Process_Signals()
/* This procedure reads the input channels for cavity pressures and valve
positions. Note that the number of pressures and valve stems is entirely
arbitrary, can be specified by the variable N in the input file. The scaling
converts input voltages to process data as the pressure transducers output
3000 psi per 1 volt, and the position transducers output 0.2 in per 1 volt. */
{
int i;
double data[16];

for (i=0;i<15;i++) AI_VRead(1,i,1,&data[i]);
   for (i=0;i<2*N;i++) P[i]=3000*data[i];        /* Currently have two pressure trans. per valve */
   for (i=1;i<=N;i++) X[i]=0.2*data[i+2*N];       /* 1 position trans. per valve */
   CTR_EvRead(1,2,&to,&tt);                       /* Read acquisition boards internal clock
                                                     which is very accurate (to .000001 S but I've
                                                     set default as 1mS */
   dtt=tt-ti;
   if (tt<ti) dtt=(tt+32768)+(32767-ti);          /* Calculate time difference since last sweep */
   time=time+dtt/1000.0;                          /* Calculate new process time */
   ti=tt;
}
/******************************************************************/
int Get_Desired_Signals()
/* This procedure calculates the desired level for the position OR pressure
transuders as specified in the input arrays. i is an index for the number of
control signals, i.e. between 1 and N. N is the number of control signals,
which may be changed for the number of drops, etc. np[i] is an array which
contains the number of data points through time for each control signal. t[i][j]
is a vector of times for each I. p[i][j] is a parallel vector of the desired
control values. With these variables defined, the currently desired control
levels at this time can be calculated using straight line interpolation, though
other more simple and complex methods do exist. */
{
int i;
float ddt;

for (i=1;i<=N;i++)                             /* Get desired level for each drop */
      {
      while (time>=t[i][np[i]]) np[i]++;          /* find index in np array for current time */
      np[i]=np[i]-1.0;
      ddt=t[i][np[i]+1]-t[i][np[i]];              /* calculate time step between input points */
      if (ddt==0.0) targ[i]=p[i][np[i]];
      if (ddt!=0.0) targ[i]=p[i][np[i]]+(time-t[i][np[i]])*(p[i][np[i]+1]-
p[i][np[i]])/(ddt);                               /* calculate desired process level using
                                                     /* straight line interpolation */
      }
return(0);
}
/******************************************************************/
int Calc_Control_Signals()
```

```c
/* This procedure calculates each of the servovalves' inputs based upon
the desired process level and the corresponding actual process state provided
by the feedback transducers. This nice code works for either pressure
or position control. Note that this code utilizes Proportional, Integral,
Differential (PID) but many more simple and complex forms exist. */
{
int i;
float err,tsig,sdev;

if (PPC==0) for (i=1;i<=N;i++) tsig[i]=P[i];  /* Use pressure as the target signal */ if (PPC==1) for (i=1;i<=N;i++) tsig[i]=X[i];  /* Use position as the target signal */ for (i=1;i<=N;i++)                            /* Calculate input for each valve */
      {
      err=(targ[i]-tsig[i])/(targ[i]+0.001);     /* this is the current error, expressed
                                                    as a percent of absolute value */ sint=Bound(1.0/(k[0][1]+0.0001),sint[i]+err,1.0/(k[0][1]+0.0001));
                                                 /* this is the time integral error. The
                                                    Bound function at the end of code is
                                                    used to saturate the integrator, so this
                                                    term has limits. */ sdev=(P[i]-POld[i])/(dt+0.001)/(targ[i]+0.001);
                                                 /* this is the time derivative error, shows
                                                    sudden changes in the behavior of the system.
                                                    Again, saturation could be used but this
                                                    control function is easily modified. */

U[i]=k[i][0]*err[i]-k[i][1]*sdev+k[i][2]*sint[i];
                                                 /* this is the control voltage calculation.
                                                    K[i][1:3] represent the proportional,
                                                    derivative, and integral gain respectively.
                                                    Note that each control I can have its own
                                                    independent set of gains. These gains
                                                    are easily modified in the input files
                                                    and may be changed to alter the performance
                                                    of the system. */

U[i]=Bound(-10.0,U[i],10.0);               /* This limits the control signals to
                                                    remain within the input bounds of the
                                                    servovalve amplifiers. */
      }
   return(0);
}
/******************************************************************/
void Output_Results()
/* This procedure outputs the voltages to the servovalve amplifiers
as well as updates the user-interface strip charts and writing
data to the output file. */
{
   for (i=1;i<N;i++) AI_VWrite(1,i,1,U[i]);
   PlotStripChart(mainp,DFC_Locs,X,N,0,0,4);
   PlotStripChart(mainp,DFC_Pres,P,N,0,0,4);
   PlotStripChart(mainp,DFC_Sigs,U,N,0,0,4);
   FmtFile(fout,"%s<%f === %f 2%f 2%f 4%f\n",time,U,X,P);
}
/******************************************************************/
void StartUp()
```

```
/* This procedure intitializes the control system and user interface. */
{
  int npoints;

Get_Set_File();                              /* Get input data */ npoints=2.0*nsteps;
  mainp = LoadPanel("dfc.uir",DFC);            /* Load graphics panel */
  if (mainp< 1) return;
  SetGraphAttribute(mainp,DFC_Pres,28,npoints);
  SetGraphAttribute(mainp,DFC_Sigs,28,npoints);
  SetGraphAttribute(mainp,DFC_Locs,28,npoints);
  DisplayPanel(mainp);

Init_DA_Brds(1,&tb);                         /* Initialize data acquisition board */
  AI_Setup (1,0,1);
  AI_Configure (1,-1,1,20,0,0);
  DIG_Prt_Config (1,0,0,0);
  AO_Configure (1,0,0,0,10.0,0);
  AO_Configure (1,1,0,0,10.0,0);
  AI_Clear(1);

dt=0.025;                                    /* time step of 25 mS, can be changed */
}
/*=================================================================*/
void Get_Set_File()
{
int i,j,fp,id;
char fname[80],a[81];

for (i=0;i<=N;i++)                           /* Initialize Variables */
    {
    U[i]=0.0;
    P[i]=0.0;
    X[i]=0.0;
    sint[i]=0.0;
    }
  filled=0.0;
  dt=0.0;
  time=0.0;

fp=OpenFile("D:\\DAVE\\CONTROLS.SET",1,2,1); /* Read desired input profiles */
  ReadLine(fp,a,80);
  ReadLine(fp,a,80);ScanFile(fp,"%s>%d\n",&PPC);/* read pressure(0) or position(1) control * for (i=1;i<=N;i++)                           /* Cycle over number of valves */
    {
    ReadLine(fp,a,80);
    t[i][0]=0.0;p[i][0]=0.0;np[i]=0;j=1;
    while (t[i][j-1]>=0.0)                     /* Read time/control vectors */
      {
      ScanFile(fp,"%s>%f %f\n",&t[i][j],&p[i][j]);
      j++;
      }
    t[i][j-1]=t[i][j-2];p[i][j-1]=0.0;
    t[i][j]=1000.0;p[i][j]=0.0;
    } fp=OpenFile("D:\\DAVE\\GAINS.SET",1,2,1);    /* Read PID Gains from file */
  ReadLine(fp,a,80);ReadLine(fp,a,80);
```

```
   for (i=0;i<=N;i++) ScanFile(fp,"%s>%f %f %f\n",&k[i][0],&k[i][1],&k[i][2]);
   CloseFile(fp);

fout=OpenFile("D:\\DFC\\OUTPUT.DAT",2,0,1);    /* Open output file */
}
/******************************************************************************/
double Bound(double lo,double xx,double hi)
{
double yy;

yy=xx;
   if (yy<lo) yy=lo;
   if (yy>hi) yy=hi;
return(yy);
}
```

```
D:\DAVE\CONTROLS.SET
Pressure (0) or Position (1) Control
1 0
Time   Pressure/Position for Valve 1 -- Must end with -1 -1
0.0  0.8
1.0  0.8
1.0  0.4
2.5  0.8
2.5  0.9
4.2  0.9
-1.0 -1.0
Time   Pressure/Position for Valve 2 -- Must end with -1 -1
0.0 0.8
4.0 0.8
-1.0 -1.0

D:\DAVE\GAINS.SET
Control Gains: kp,ki,kd for valve1, valve2
0.20 0.08 0.02
0.20 0.08 0.02
```

DEFINES.H define N 2

VARS.H

```
static double U[N+1],vp[N+1];            /* U1, U2, ... (-10.0 to 10.0) */
static double P[2*N+2];                  /* P1, P2, ... (psi) */
static int np[N+1],PPC;                  /* Number of Points in control I, control method */
static double t[N+1][20],p[N+1][20];     /* np points: time & pres/pos profile */
static double time;                      /* Process time */
static double nsteps,df,dt,dtt;          /* time related variables */
static double sint[N+1];
static double k[N+1][3],targ[3];         /* gains for PID control */
static double VRAM,CVOL;

/* other constants used in Lab Windows */
static int mainp;
static int tb;
static int fout;

/* function declarations */
...                                      /* standard c code */
```

APPENDIX B1

D:\DAVE\CONTROLS.SET
Pressure (0) or Position (1) Control
1

| Time | Position for Valve 1 |
|---|---|
| 0.0 | 1.0 |
| 0.3 | 1.0 |
| 0.3 | 0.4 |
| 2.0 | 0.4 |
| 2.1 | 1.0 |
| 2.2 | 0.0 |
| 2.3 | 1.0 |
| 2.3 | 0.6 |
| 6.0 | 0.6 |
| -1.0 | -1.0 |

| Time | Position for Valve 2 |
|---|---|
| 0.0 | 1.0 |
| 2.0 | 1.0 |
| 2.1 | 0.0 |
| 2.2 | 1.0 |
| 2.3 | 0.0 |
| 2.3 | 0.3 |
| 6.0 | 0.3 |
| -1.0 | -1.0 |

APPENDIX B2

```
D:\DAVE\CONTROLS.SET
Pressure (0) or Position (1) Control
0
Time   Pressure for Valve 1
0.0    0.0
2.0    2000.0
2.5    2400.0
6.0    3000.0
6.1    0.0
-1.0   -1.0
Time   Pressure for Valve 2
0.0    0.0
1.0    2000.0
1.5    3500.0
2.0    4000.0
6.0    5000.0
6.2    0.0
-1.0   -1.0
Time   Pressure for Valve 3
0.0    0.0
1.0    1900.0
1.5    2300.0
2.0    2500.0
2.5    2200.0
5.0    500.0
6.0    0.0
-1.0   -1.0
```

What is claimed is:

1. A method for injection molding, the method comprising:

initiating a flow of mold material through a first gate into a mold cavity;

sensing a first process condition;

determining a first target process condition;

comparing the first sensed process condition and the first target process condition;

generating a first control signal based at least in part on the comparison between the first sensed process condition and the first target process condition;

adjusting a first valve to change the effective size of the first gate while mold material is flowing through the first gate, wherein the first valve is adjusted based at least in part on the first control signal;

initiating a flow of mold material through a second gate into the mold cavity;

sensing a second process condition;

determining a second target process condition;

comparing the second sensed process condition and the second target process condition;

generating a second control signal based at least in part on the comparison between the second sensed process condition and the second target process condition;

adjusting a second valve to change the effective size of the second gate while mold material is flowing through the second gate, wherein the second valve is adjusted based at least in part on the second control signal; and preferentially increasing the flow of mold material through the first gate in comparison with the flow of mold material through the second gate by adjusting at least one of the first and second valves while mold material is flowing through at least one of the gates.

2. The method of claim 1 further comprising:

after preferentially increasing the flow of mold material through the first gate in comparison with the flow of mold material through the second gate, thereafter preferentially increasing the flow of mold material through the second gate in comparison with the flow of mold material through the first gate by adjusting at least one of the first and second valves while mold material is flowing through at least one of the gates.

* * * * *

UNITED STATES PATENT AND TRADEMARK OFFICE
CERTIFICATE OF CORRECTION

PATENT NO. : 5,556,582
DATED : 17 September 1996
INVENTOR(S) : David O. Kazmer

It is certified that error appears in the above-indentified patent and that said Letters Patent is hereby corrected as shown below:

On the title page, item [22] replace "Feb. 17, 1995" with —Feb. 7, 1995—.

Signed and Sealed this

Eighth Day of April, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,556,582
DATED : 17 September 1996
INVENTOR(S) : David O. Kazmer

It is certified that error appears in the above-identified patent and that said Letters Patent is hereby corrected as shown below:

Please insert the following language below the title at the top of column 1 of the patent: "This invention was made with Government support under contract DE SG51-9412020440 awarded by the Department of Energy. The Government has certain rights in this invention."

Signed and Sealed this

Twenty-second Day of April, 1997

Attest:

BRUCE LEHMAN

*Commissioner of Patents and Trademarks*

*Attesting Officer*

UNITED STATES PATENT AND TRADEMARK OFFICE
CERTIFICATE OF CORRECTION

PATENT NO. : 5,556,582
DATED : September 17, 1996
INVENTOR(S) : David O. Kazmer

It is certified that error appears in the above-indentified patent and that said Letters Patent is hereby corrected as shown below:

Column 1, line 5, insert the following:

"This invention was made with Government support under contract DE FG51-94R2020440 awarded by the Department of Energy. The Government has certain rights in this invention."

This certificate supersedes Certificate of Correction issued April 22, 1997.

Signed and Sealed this

Twenty-third Day of June, 1998

Attest:

BRUCE LEHMAN

Attesting Officer  Commissioner of Patents and Trademarks

UNITED STATES PATENT AND TRADEMARK OFFICE
CERTIFICATE OF CORRECTION

PATENT : 5,556,582

DATED : September 17, 1996

INVENTOR(S) : David O. Kazmer

It is certified that error appears in the above-identified patent and that said Letters Patent is hereby corrected as shown below:

In column 1, after the title on line 3, insert the following:
  "This invention was made with Government support under contract
  DE FG51-94R020440.--.

This certificate supercedes Certificate of Correction issued June 23, 1998.

Signed and Sealed this

Fourth Day of August, 1998

Attest:

BRUCE LEHMAN

*Attesting Officer*        *Commissioner of Patents and Trademarks*